Aug. 16, 1938.　　　　J. B. ECK　　　　2,126,698

ADJUSTABLE SADDLE FOR COASTER WAGON BOXES

Filed Nov. 6, 1936

INVENTOR.
Joseph B. Eck,
BY Morsell, Lieber & Morsell
ATTORNEYS.

Patented Aug. 16, 1938

2,126,698

UNITED STATES PATENT OFFICE 2,126,698

ADJUSTABLE SADDLE FOR COASTER WAGON BOXES

Joseph B. Eck, Sheboygan, Wis.; Anna Eck, Sheboygan, Wis., executrix, of Joseph B. Eck, deceased, assignor to Garton Toy Company, Sheboygan, Wis.

Application November 6, 1936, Serial No. 109,411

2 Claims. (Cl. 155—5)

This invention relates to improvements in coaster wagons, and more particularly to adjustable saddles for coaster wagon boxes.

In the use of a coaster wagon when the occupant wishes to propel it, it is common practice for the child to straddle a rear side portion of the box wall and rest his weight on one leg positioned on the floor of the wagon box. The other leg of the child is extended downwardly exteriorly of the wagon box or body and the child uses that foot for pushing purposes to propel the wagon.

Obviously, this accepted mode of propulsion grows tiresome because of the child's cramped position and the strain of rubbing imposed on the leg or knee resting on the box bottom and bearing most of the child's weight. This method also imposes severe rubbing and wear on the child's wearing apparel. The present invention, therefore, seeks to provide a saddle attachment for a coaster wagon box, which will permit the child to propel the wagon in the accepted manner, but which will provide a comfortable support for the operator and will take the weight and strain off of the child's leg disposed within the coaster wagon box A further object of the invention is to provide a supporting saddle or seat which may be removably attached to any desired portion of the surrounding rail or flange of a coaster wagon box.

A further object of the invention is to provide a coaster wagon saddle removably attachable to a wall portion of a coaster wagon box, and which is adjustable vertically and angularly in a horizontal plane.

A further object of the invention is to provide a coaster wagon saddle of the character described which is positioned compactly adjacent a wall of the wagon box and which does not interfere with the capacity or normal use of the wagon box.

A further object of the invention is to provide an adjustable and removable saddle for coaster wagon boxes which is of very simple construction, which lends a neat, attractive and unusual appearance to the wagon, which is strong and durable and inexpensive, and which is well adapted for the purposes set forth.

With the above and other objects in view the invention consists of the improved adjustable saddle for coaster wagon boxes, and its parts and combinations, as set forth in the claims, and all equivalents thereof.

In the accompanying drawing in which the same reference characters indicate the same parts in all of the views.

Figure 1:
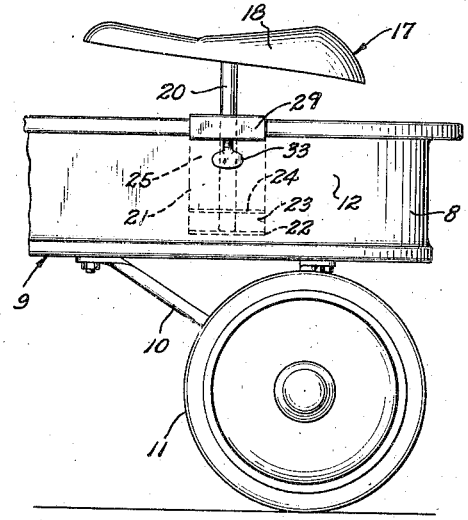
Fig. 1 is a fragmentary view of a coaster wagon having the improved adjustable saddle mounted on a wall of the wagon box.

Referring now more particularly to the drawing, it will appear that the improved adjustable saddle is adapted to be associated and cooperate with the box portion 8 of a child's coaster wagon 9. In coaster wagons of the type illustrated, the rectangular box member 8 is mounted on suitable bolster members 10 which carry the wheels 11. The box 8 is formed with a continuous vertical side wall 12 and a floor or bottom 13. In the type of wagon illustrated, the box is formed of sheet metal and the continuous side wall 12 has its upper peripheral portion flanged to form a laterally projecting continuous horizontal side rail 14. To form the rail, the metal is flanged horizontally outwardly at right angles to the vertical wall 12, and then downwardly vertically as at 15 and then horizontally inwardly as at 16.

The improved saddle designated generally by the numeral 17 includes a properly shaped seat or saddle 18 having a strap 19 secured to its under-surface. The medial portion of the strap has affixed thereto the upper headed end of a vertical post 20.

In order to permit adjustable mounting of the saddle relative to the rail 14 and side wall 12 of the wagon box, a one-piece bracket 21 is provided. This bracket is formed out of sheet metal and includes a bottom horizontal flange 22, a short vertical flange 23 at one side of the bottom flange 22, a horizontal flange 24 extending inwardly from the upper portion of the flange 23, a long vertical flange 25 extending upwardly from the other side of the flange 24 and offset from the flange 23, a horizontal flange 26 at the upper end of the vertical flange 25 co-extensive with the flange 24, a short vertical flange 27 in the plane of the flange 23, a top horizontal flange 28 offset outwardly from the horizontal flanges 24 and 26, an outer down-turned vertical flange 29 and a short inturned horizontal flange 30 extending partially below the horizontal flange 28. The lowermost flange 22 forms a support for the lower end of the seat post 20 and said seat post is extended through alined apertures 31 and 32 in the flanges 24 and 26 respectively.

Figure 4:
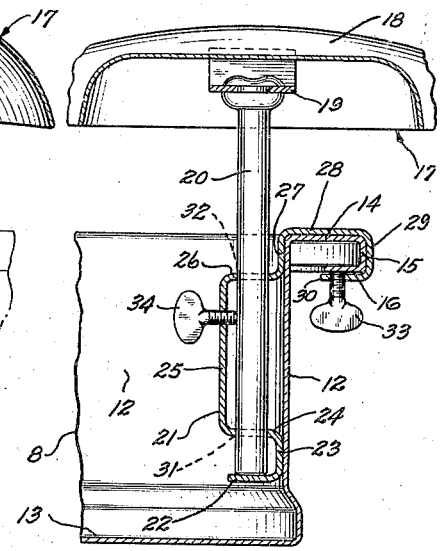
Fig. 4 is a transverse vertical sectional view taken on the line 4—4 of Fig. 1 and showing the saddle in engaged position relative to the side wall and flange of the coaster wagon box.

The bracket may be mounted against the inner face of any desired portion of the wall 12 of the wagon box and is engaged with the flanged rail 14 there-adjacent. The engagement and mounting is effected in the manner best shown in Fig. 4, wherein it will be observed that the flanges 28, 29 and 30 of the bracket embrace the correspondingly shaped portions 14, 15 and 16 of the side rail. In this position it will also be noted that the short vertical flanges 23 and 27 of the bracket rest against inner face portions of the side wall 12. The bracket is held in the desired position of mounting by a clamping bolt 33 which is threaded through a tapped opening in the flange 30 of the bracket and may be turned to clampingly impinge against the bottom surface of the rail flange 16. It will furthermore be noted that the clamping bolt 33 is entirely covered and protected by the overhanging rail 14.

The seat 18 and post 20 may be turned and may also be slightly adjusted vertically relative to the bracket 21. These adjustments permit disposition of the seat at the desired elevation and at the right angle for the comfort of the user, and the post is held in properly adjusted position by means of a clamping bolt 34 threaded through a tapped opening in the inner vertical flange 25 of the bracket, and adapted to have its inner end clampingly engage the post 20.

Figure 2:
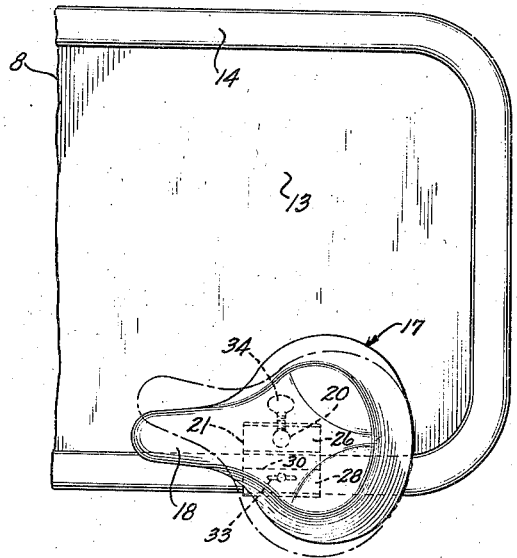
Fig. 2 is a plan view of the showing in Fig. 1.
Figure 3:
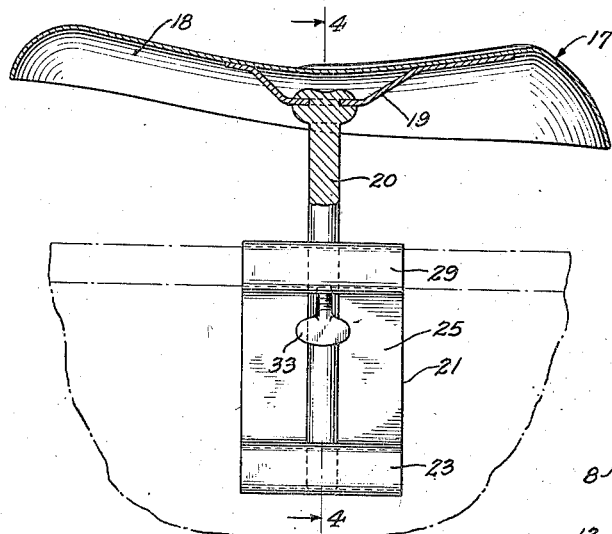
Fig. 3 is an enlarged detail view, particularly in vertical section, of the improved saddle.

Although the seat may be positioned anywhere along the side and adjoining rail of the coaster wagon box, when the wagon is to be propelled by the occupant in the accustomed manner, the seat should probably be disposed toward the rear of the wagon box adjacent one side wall thereof, as shown in Figs. 1 and 2. The child can then straddle the saddle so that the saddle will take his weight and form the main support, but one leg of the child may be disposed within the wagon box on the bottom 13 thereof, in the usual manner. This positioning permits the other leg of the child to hang over the saddle free of the wagon, and the wagon may then be propelled by the use of the latter leg. With this arrangement, the user of the wagon is supported in a comfortable convenient manner, and normal operation or propulsion of the wagon in the accepted style is not in any way interfered with. However, the saddle bears the main weight of the child so that the child's leg and knee within the coaster wagon box is not subjected to this weight and strain.

From the foregoing description, it will appear that the improved saddle for coaster wagon boxes provides a removable and readily adjustable seat or supporting means for the user of the wagon and in fact enhances the usefulness of the wagon, and does not interfere with nor decrease the capacity or usefulness of the wagon box. The device is further more of simple and novel construction, and adds an attractive appearance to the entire wagon.

What is claimed as the invention is:

1. In combination, a coaster wagon body having an upstanding side wall formed with an outwardly directed top flange, a bracket hookingly embracing said flange and having an inwardly offset portion partially resting against an adjacent inner surface portion of said side wall, a post adjustably mounted in said offset portion of the bracket, and a saddle carried by said post.

2. In combination, a coaster wagon body having an upstanding peripheral wall formed with an outwardly directed top flange, an angularly shaped bracket having a portion removably embracing any selected portion of said flange and having another inwardly offset portion resting at two vertically spaced-apart areas against adjacent inner surface portions of said side wall, clamping means carried by the first-mentioned portion of the bracket and engageable with the flange, a vertical rod adjustably mounted in the offset portion of the bracket, clamping means in the offset portion of the bracket for releasably securing the rod in adjusted position, and a saddle carried by the upper end portion of said rod.

JOSEPH B. ECK.